Jan. 22, 1963    F. LORENZ    3,075,050
APPARATUS FOR CARRYING OUT TIME, WORK AND MOTION STUDIES
Filed Oct. 17, 1958    3 Sheets-Sheet 1

INVENTOR.
FRIEDRICH LORENZ
BY

INVENTOR.
FRIEDRICH LORENZ

Jan. 22, 1963  F. LORENZ  3,075,050
APPARATUS FOR CARRYING OUT TIME, WORK AND MOTION STUDIES
Filed Oct. 17, 1958  3 Sheets-Sheet 3
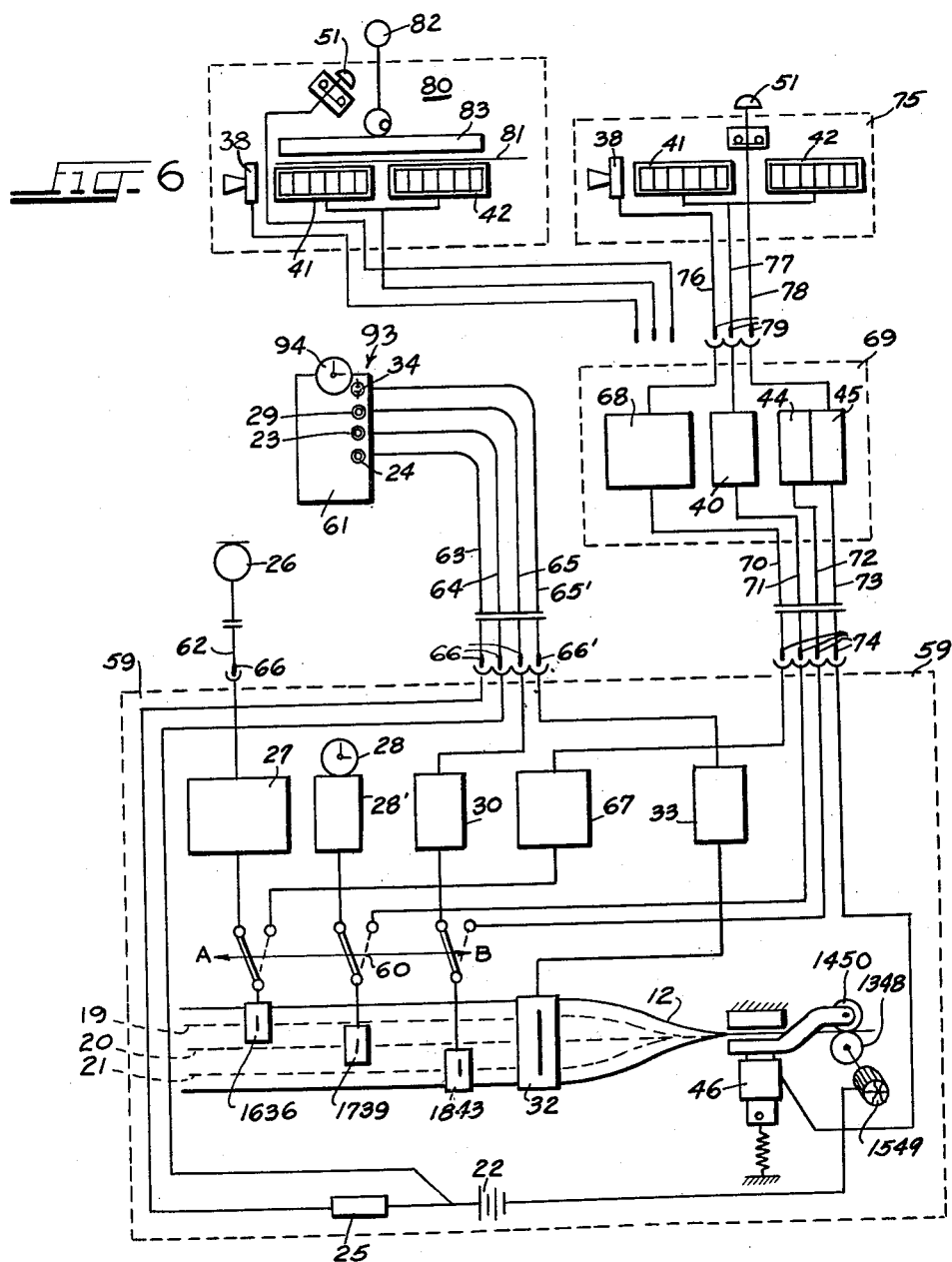
INVENTOR.
FRIEDRICH LORENZ 3,075,050
APPARATUS FOR CARRYING OUT TIME, WORK
AND MOTION STUDIES
Friedrich Lorenz, 13 Woehlerstrasse,
Ludwigshafen (Rhine), Germany
Filed Oct. 17, 1958, Ser. No. 767,986
11 Claims. (Cl. 179—100.2)

This invention relates to data recording and evaluating apparatus and, more particularly, to apparatus which is particularly well adapted for use in carrying out time, work, methods and motion studies, especially chronological studies for incentive wages.

It is a primary object of the present invention to enable time, work and motion studies to be conducted in a novel and expeditious manner.

Apparatus, which included instruments having magnetic recording carriers in the form of wires or tapes, have been heretofore known and used in the making of time, work and motion studies. In general, it may be stated that when magnetic recording devices have been used in the making of time, work and motion studies, an oral description of the various phases of the process or operation being studied has normally been recorded on a magnetic recording carrier, the dividing line between the individual phases of the process or operation being indicated by signals reproduced on the recording carrier by what will herein be referred to as "marking signals." One method of evaluating the record afforded by such recording carriers has been for an operator to listen to and transcribe in writing the description of a particular phase of the process or operation being studied, the operator manually starting and stopping the carrier at each marking signal, and measuring the distance between the marking signals to determine the elapsed time required for a particular phase of such a process or operation.

In such a method of carrying out time studies, the time measurement is dependent upon the running speed of the carrier. To overcome this dependency upon the accuracy of the running speed of the carrier, it has been heretofore proposed (Germany Patent No. 847,985) to impress on the carrier indicia which will herein be referred to as "time signals," the time signals emanating at regular intervals from a suitable time measuring instrument such as, for example, a clock or a watch. With such time signals recorded on the carrier, an operator, by counting the time signals between two marking signals, when listening to the record reproduced by the carrier, may obtain an accurate measurement of the time that has elapsed between the impression of the two marking signals, with the accuracy of the measurement being independent of the running speed of the carrier, either when the recording was being made on the carrier or when the recording is being "played back." However, in practice, it is difficult for an operator to listen to and count time signals between two marking signals and, simultaneously, listen to and transcribe the spoken text occurring between the two marking signals. It is an important object of this invention to enable the disadvantages, which have heretofore been common in the making and evaluating of time, work and motion study records, to be overcome.

Another object of the present invention is to enable time signals which have been impressed upon such a carrier to be counted in a novel and expeditious manner.

A further object is to enable time signals, which have been applied to such a carrier during the making of time, work and motion studies, to be automatically counted, during evaluation of the carrier, by counters from which the number of time signals which were emitted during any particular phase or portion of such a process or operation, may be visually read by the operator at the end of the phase.

Another important object of the present invention is to provide apparatus of the aforementioned type, having parts so constituted and arranged that the movement of the carrier, during evaluation of the latter, is automatically stopped by the marking signals thereon.

Another object of the present invention is to afford novel apparatus of the aforementioned type wherein, when the movement of the carrier has been stopped by a marking signal denoting the end of a particular phase of the process or operation being studied, the carrier remains stopped until released by the operator so that the operator has unlimited time to transcribe any text which he has listened to on the carrier, to note and transcribe the time reading for that phase or process of the operation and, if he so desires, to evaluate the data of this phase of the process or operation, before evaluation of the next phase is commenced.

Yet another object is to afford apparatus of the aforementioned type by which frequency of events occurring in individual phases of a process or operation may be recorded and counted in a novel and expeditious manner in the making of a time and motion study.

Another object of the present invention is to provide members which impress on the carrier signals from a counter simultaneously with the electromagnetic marking signals.

Another object is to reduce the time required for evaluating the carrier by diminishing the speed of the carrier over parts of its length when recording, and/or, when playing back, accelerating the speed over said parts.

Another object is to provide control means to enable the regular functioning of the whole of the apparatus to be visually read by the operator.

A further object of the present invention is to afford novel recording and evaluating apparatus for use in making time, work and motion studies, and wherein the parts thereof are constituted and arranged in a novel and expeditious manner.

Another object is to provide novel apparatus for making and evaluating time, work and motion study records, which are relatively simple to operate and are practical and efficient in operation, and which may be readily and economically produced commercially.

Other and further objects of the present invention will be apparent from the following description and claims and are illustrated in the accompanying drawings which, by way of illustration, show the preferred embodiments of my present invention and the principles thereof, and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 5 is a diagrammatic illustration of a modified form of the apparatus shown in FIGS. 1 and 2;

FIG. 6 is a diagrammatic illustration of a modified form of a portion of the apparatus shown in FIG. 5.

Figure 1:
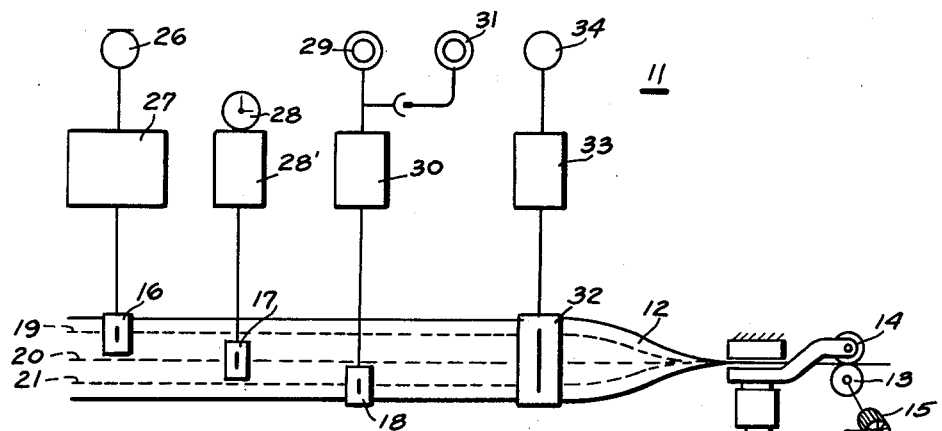
FIG. 1 is a diagrammatic illustration of a record making apparatus embodying the principles of the present invention.

Referring to FIG. 1, a record-making apparatus 11 is shown which includes a recording carrier 12 threaded between a drive roller 13 and a pressure roller 14 for longitudinal movement from left to right, as viewed in FIG. 1, upon rotation of the drive roller 13 by a motor 15 connected thereto.

The motor 15 is connected to a source of power, for example a battery 22. If switch 23 is closed, the motor 15 receives the full voltage of the battery 22 and revolves at normal speed. If switch 24 is closed an electric resistance 25 is interposed between the battery 22 and the motor 15 so that the motor receives only part of the voltage of the battery and revolves at reduced speed. The reason why two speeds of the motor are required will be apparent from the following description.

Three sound heads in the form of recording heads 16, 17 and 18 are mounted in spaced relation to each other, transversely of the recording tape 12, in such a position as to form three separate, parallel recording tracks 19, 20 and 21, respectively, during the aforementioned longitudinal movement of the recording tape 12.

The track 19 is intended for receiving an impression of the spoken text to be recorded on the carrier 12. A microphone 26 is connected through an amplifier 27 to the recording head 16 in such a manner that an operator, during operation of the apparatus 11, may speak into the microphone 26 to thereby record along the track 19 his description or other comments regarding the particular phase of the process or operation being studied.

The second track 20 is intended for receiving the impression of the time signals which are to be reproduced on the recording tape 12 for the purpose of measuring the elapsed time occurring during the different phases of the process or operation being studied. For this purpose, a timing device such as a clock 28 is connected through a time signal emitting device 28' to the recording head 17, whereby time signals produced by the clock 28 may be impressed on the magnetic tape 12 along the recording track 20.

The third record track 21 is intended for receiving the impression of the marking signals by which the beginning and end of a particular phase of the process or operation being studied is indicated on the recording tape 12. For the purpose of impressing such marking signals on the tape 12, a suitable switch such as, for example, a press-button switch 29 is connected through an amplifier 30 to the recording head 18, so that when the operator closes the switch 29 a marking signal is immediately impressed by the recording head 18 on the record track 21 of the tape 12.

When time studies are being made of certain machines such as, for example, presses, stamping machines, and the like, it is often desirable to record with the highest possible accuracy the times at which different parts of the machine are operated or disposed in different positions. For this purpose, one or more switches, such as the switch 31, shown in FIG. 1, may be connected in parallel with the switch 29, and the switches 31 may be mounted on the machine being studied in position to be actuated by the different parts of the machine so that actuation of those parts produce marking signals on the track 21 of the tape 12 upon actuation of the respective switches 31.

In order that the regular functioning of the apparatus described may be controlled during the recording, a sound head 32 is arranged at a short distance from the recording heads 16, 17, and 18 which extends over the full width of the carrier 12 and transforms the electromagnetic signals impressed on tracks 19, 20, and 21 into electrical impulses. Through an amplifier 33 these electrical impulses are fed to a flashing lamp 34 arranged in the field of vision of the operator. The operator can see from the flashing and flickering of this flashing lamp whether or not the carrier is moving and if the time and marking signals as well as the spoken text have been duly impressed on the carrier.

Figure 2:
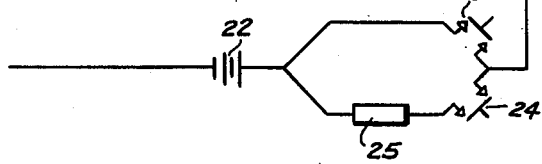
FIG. 2 is a diagrammatic illustration of a record-evaluating apparatus embodying the principles of the present invention.

In FIG. 2, an evaluation device or apparatus 35 is diagrammatically shown, the apparatus 35 being used in association with the recording apparatus 11 for evaluating the data or intelligence which has been impressed on the carrier 12 in the apparatus 11 during the recording portion of the time, work and motion study.

The apparatus 35 includes a sound head in the form of a reproducing head 36 which is connected through an amplifier 37 to a loud speaker 38. The reproducing head 36 is so disposed in the apparatus 35 that when the tape 12 is fed longitudinally through the apparatus 35 the head is effective to pick up the spoken text recorded on the track 19 so that it is reproduced through the loud speaker 38 and may be heard by the operator evaluating the data impressed on the carrier 12.

The apparatus 35 also includes a sound head in the form of a reproducing head 39 which is connected through an amplifier 40 to two suitable impulse counters 41 and 42, the counters 41 and 42 being connected to the amplifier 40 in parallel relation to each other. The reproducing head 39 is mounted in the apparatus in such position that as the carrier 12 is fed longitudinally through the apparatus 35, the reproducing head 39 is effective to pick up the time signals impressed on the track 20 and feed them as electrical impulses through the amplifier 40 to the counters 41 and 42. If desired, only one of the counters 41 or 42 may be used. However, I prefer to use two counters, one of the counters such as, for example, the counter 41 being a counter which may be used to count the impulses during each phase of a time, work and motion study, this latter counter being returned to zero after each phase has been completed and the number of time signals in that phase has been read therefrom. The other counter, 42, is preferably an accumulative counter or "total" counter, which may be used to count and record the total number of time signals occurring in a complete study, which will normally include several of the aforementioned phases.

The evaluating apparatus 35 also includes a third sound head in the form of a reproducing head 43 which is connected through an amplifier 44 and a suitable switch box 45 to a suitable electromagnetic device such as, for example, a solenoid 46, which is effective upon energization to stop the movement of the carrier 12 through the apparatus 35, as will be discussed in greater detail presently.

Suitable drive mechanism 47 is embodied in the apparatus 35 for feeding the carrier 12 longitudinally therethrough. The drive mechanism 47 shown in FIG. 2 embodies a drive roller 48 operatively connected to a motor 49 for rotation thereby, and a pressure roller 50 disposed above the roller 48 in such a position that the carrier 12 may be fed longitudinally between the rollers 48 and 50, and when the roller 50 is disposed in normal operative position, the carrier 12 is pressed thereby against the roller 48 so that rotation of the roller 48 by the motor 49 is effective to advance the carrier 12 through the apparatus 35. The operation of the motor 49 may be controlled by a suitable switch such as the switch 58 shown in FIG. 2.

The pressure roller 50, FIG. 2, is rotatably mounted on one end of an arm 52, the other end of the arm 52 being mounted on the upper end of the plunger 53 of the solenoid 46. The solenoid 46 is of the spring-urged type, embodying a spring 54 which is effective to urge the plunger 53 downwardly as diagrammatically shown in FIG. 2. Energization of the solenoid 46 is effective to cause the plunger 53 to move upwardly as view in FIG. 2, to thereby move the roller 50 out of pressing engagement with the carrier 12 and thus cause the movement of the carrier 12 through the apparatus 35 to be stopped.

The solenoid 46 also comprises a portion of a brake mechanism 55, FIG. 2, which includes a stationary brake jaw 56 and a movable brake jaw 57. The movable jaw 57 is mounted on the upper end of the plunger 53 of the solenoid 46, and as shown in FIG. 2, comprises the end of the arm 52 opposite to that on which the roller 50 is mounted. The brake jaws 56 and 57 are disposed on opposite sides of the carrier 12 in such a position that, normally, they are disposed in spaced relation to the carrier 12, and, therefore, the carrier 12 is free to move therebetween. However, the brake jaws 56 and 57 are also so disposed relative to each other that, when the solenoid 46 is energized and the plunger 53 thereof is moved upwardly thereby against the urging of the spring 54, the brake jaw 57 is effective to clamp the carrier 12 against the brake jaw 56 and thereby immediately stop movement of the carrier 12 through the apparatus 35 in a positive manner.

The reproducing head 43 is disposed in the apparatus 35 in such a position as to be effective to pick up the marking signals impressed on track 21 of the carrier 12. A suitable switching means, not shown, which may be any one of several well known types such as, for example, a control relay, is mounted in the switch box 45 and may be connected to the amplifier 44, the solenoid 46, and a suitable manually operable switch such as the switch 51, FIG. 2. In this manner, the solenoid 46 is so connected to the reproducing head 43 that when a marking signal is picked up by the reproducing head 43 from the carrier 12, the electrical impulse caused thereby is fed from the reproducing head 43 through the amplifier 44 to the switch box 45 and is caused to energize the solenoid 46 to thereby raise the roller 50 from engagement with the carrier 12 so as to immediately stop movement of the carrier 12 through the apparatus 35. The solenoid 46 is maintained in this energized condition by the aforementioned suitable switching means until the switch 51 is manually operated by the operator. When this occurs, the solenoid 46 is deenergized and the carrier 12 is again fed through the apparatus 35 until the next marking signal is picked up by the reproducing head 43 and the carrier 12 is again immediately stopped.

The braking of the carrier 12 by the brake jaws 56 and 57 simultaneously with the lifting of the pressure roller 50 from engagement with the carrier 12 has the advantage that the momentum of the motor 49 which would have the effect of prolonging the time required for stopping the movement of the carrier 12, is eliminated at once so that the carrier 12 with its small weight comes to a standstill almost immediately. It cannot happen that the carrier 12, while being held by the brake jaws 56 and 57, is damaged by the rollers 48 and 50, as is the case when rollers such as the rollers 48 and 50 continue to rotate in pressing engagement while the brake jaws are closed.

From the foregoing, it will be seen that in the operation of my novel apparatus as shown in FIGS. 1 and 2, an operator carying out a time, work and motion study may initiate movement of the carrier 12 through the apparatus 11 by suitably energizing the motor 15 such as, for example, by closing the switch 23. Thereafter, at the start of the initial phase of the process or operation to be studied, the operator may actuate the switch 29 to impress a marking signal on the track 21. At the end of each phase and the beginning of each new phase of the operation being studied, the operator may again actuate the switch 29 or the switch 31, respectively, to thereby impress a new marking signal on the track 21. At the completion of the time, work and motion study of the particular process or operation, the operator may again actuate the switch 23 to thereby deenergize the motor 15 and stop movement of the carrier 12 through the apparatus 11.

At all times during the recording portion of the time, work and motion study, the time signal mechanism 17, 28, 28' is effective to impress accurate time signals on the track 20, so that when the data on the carrier 12 is later being evaluated, the time signals between any two marking signals may be counted to thereby afford an accurate measurement of the elapsed time for each phase, irrespective of the running speed of the carrier 12 through the apparatus 11.

Also, while the recording portion of the time, work and motion study is in progress, the operator may, by speaking into the microphone 26, record any desired text or description on the track 19, so that a permanent, clear record is afforded an operator, subsequently evaluating the data on the carrier 12, as to what operation was being recorded between any two marking signals and of any other pertinent information the recording operator spoke into the microphone 26.

In the subsequent evaluation of the intelligence or data recorded on the carrier 12, initiation of longitudinal movement of the carrier 12 through the evaluating apparatus 35 may be effected by the operator, by the manual closing of the switch 58 to thereby energize the motor 49 and cause the drive roller 48 to move the carrier 12 longitudinally. When the first marking signal, indicating the start of the time, work and motion study, is picked up by the reproducing head 43, the carrier 12 is immediately stopped by the energization of the solenoid 46 as previously described. At this time, the operator making the evaluation may set the counters 41 and 42 to zero, and prepare to evaluate the time, work and motion study. Thereafter, the operator may actuate the switch 51 to thereby cause deenergization of the solenoid 46 and again cause the carrier 12 to be longitudinally fed through the apparatus 35.

While the carrier 12 is moving through the apparatus 35 into position wherein the reproducing head 43 picks up the next marking signal, the reproducing head 39 is picking up the time signals and feeding them in the form of electrical impulses through the amplifier 40 to the counters 41 and 42 by which they are being recorded. At this same time, the reproducing head 36 is picking up the spoken text reproduced on the track 19 between the first and second marking signals, and this spoken text is being reproduced through the amplifier 37 and the speaker 38 so that the operator may hear and transcribe the same.

When the next, or second marking signal is picked up by the reproducing head 43, an impulse is fed through the amplifier 44 to the switch box 45, and the solenoid 46 is energized to thereby immediately stop the carrier 12, as previously described. The movement of the carrier 12 through the apparatus 35 is thus stopped until the operator again actuates the switch 51. Hence, the operator has full control of the initiation of renewed movement of the carrier 12 through the apparatus 35 after such movement has been stopped by the pick-up of a marking signal. Therefore, at the end of each phase, he may take readings from the counters 41 and 42, make calculations, or do other things with relation to the evaluation of the phase which has just been completed without any necessity for hurrying. When the operator is ready, he may initiate operation of the apparatus 35 for evaluation of the next phase by actuating the switch 51. These operations may be repeated for each phase of the process or operation recorded on the carrier 12.

In some instances, individual work phases, which can be described in a few words, extend over a long period of time. In such instances, I prefer to move the carrier 12 during the recording at reduced speed as long as no spoken text is being recorded on the carrier 12. For this purpose, the motor 15 is supplied with a reduced electrical voltage. This is achieved by actuating the switch 24 shown in FIG. 1. This measure results in the time signals which emanate from the time signal mechanism 17, 28, 28' at constant intervals of time being drawn closer together on the carrier 12. When spoken text is to be recorded on the carrier 12, the carrier 12 is moved at normal speed, which is achieved by opening switch 24 and closing switch 23. When playing back, the carrier is moved through apparatus 35 at normal speed. The counters 41 and 42 which count the time signals then work with increased speed where the carrier 12 does not contain any spoken text, because the time signals are closer together on these parts of the carrier 12. Saving in the length of the carrier 12 is thereby achieved and the time required for evaluating the carrier 12 is reduced.

The evaluation time can be further reduced by moving the carrier 12 at increased speed over the lengths where no spoken text has been recorded. The greatest possible speed is determined by the maximum counting frequency of the counters 41 and 42.

Whereas FIGS. 1 and 2 show a diagrammatic embodiment of the present invention, FIG. 5 shows an embodiment of the invention which corresponds to the block circuit diagrams familiar to those skilled in the electrical arts. In FIGS. 1 and 2, the devices for recording and reproducing or evaluating the data are shown separately. In FIG. 5, they are shown as a single, unitary device. In FIG. 5, parts which are identical to corresponding parts shown in FIGS. 1 and 2 are indicated by the same reference numerals as in FIGS. 1 and 2, combined reference numerals, i.e., reference numerals with 4 digits, being used where corresponding parts are shown both in FIG. 1 and in FIG. 2.

The form of the invention shown in FIG. 5 includes a portable unit 59 which includes a suitable base on which are mounted the drive mechanism, the brake mechanism, the text recording amplifier 27, the time signal emitter 28, 28' and the marking signal amplifier 30. A double throw switch 60 is also mounted on the base and is movable between a "recording" position shown in solid lines in FIG. 5, wherein the sound heads 1636, 1739, 1843 are connected to the recording apparatus, and a "reproducing" position as shown in broken lines in FIG. 5, wherein the sound heads 1636, 1739, 1843 are connected to the reproducing or evaluating apparatus.

A suitable source of electric power, shown in FIG. 5 as being in the form of a battery 22, is connected to the driving motor 1549 and the switches 23 and 24 which, in this embodiment of the invention, are connected to the motors 1549 for controlling the operation of the same in the same manner as the switches 23 and 24 are connected to the motors 15 and 49 in the form of the invention shown in FIGS. 1 and 2 respectively. It will be appreciated by those skilled in the art that sources of electric power other than the battery 22 and such as, for example, a suitable connector by which the motor 1549 and the switches 23 and 24 may be connected to a generator or other suitable source of power, not shown, may be used in place of a battery 22 without departing from the purview of the present invention.

When the double throw switch 60 is disposed in the aforementioned recording position, as shown in solid lines in FIG. 5, the microphone 26 is connected through the amplifier 27 to the sound head 1636 for reproducing text signals on the track 19 of the carrier 12, the timing device or clock 28 is connected through the emitter 28' to the sound head 1739 for reproducing timing signals on the track 20 of the carrier 12 and the switch 29 on the writing board 61 is connected through the amplifier 30 to the sound head 1843 for impressing marking signals on the track 21 of the carrier 12 in the apparatus shown in FIG. 5. Movement of the carrier 12 through the apparatus may be controlled in the same manner by the switches 23 and 24 as in the form of the apparatus shown in FIG. 1, and the impressing of text signals, timing signals, and marking signals, on the tracks 19, 20 and 21, respectively, may be effected through the sound heads 1636, 1739 and 1843, respectively, in the same manner as such intelligence is impressed on the carrier 12 through the recording heads 16, 17 and 18 respectively, in the apparatus 11.

The lines or cables 62, 63, 64 and 65, by which the microphone 26, the switches 24, 23 and the switch 29 are connected to the amplifier 27, the motor 1549 and the amplifier 30, respectively, each includes a coupling 66 whereby the microphone 26, the switches 24 and 23, and the switch 29 may be quickly and easily disconnected from the unit 59, if this is desired. In a similar manner, the flashing lamp 34 is connected to the amplifier 33 through cable 65' and coupling 66'.

The switches 23, 24, 29 and the flashing lamp 34 form a practical unit 93 (FIG. 5) which the operator holds in his hands during the recording. The unit 93 is preferably built as a writing board and should be provided with a device for holding a clock 94.

One difference between the reproducing apparatus as shown in FIG. 2 and the reproducing apparatus shown in FIG. 5 is that the amplifier connected to the text reproducing sound head 1636 is a two-stage amplifier 67—68, one of the stages, namely, the preliminary stage 67 being mounted on the base 59, and the other stage, namely the second stage 68, or loud speaker and stage 68, being mounted on the base 69.

When the switch 60 is disposed in the aforementioned reproducing position, as shown in broken lines in FIG. 5, the sound head 1636 is connected through the amplifier 67—68 to the microphone 38; the time signal sound head 1739 is connected through the amplifier 40 on the base 69 to the counters 41 and 42; and the marking signal sound head 1843 is connected through the amplifier 44 and the switch box 45 to the switch 51, and to the solenoid 46 of the brake mechanism 55.

The cables 70, 71 and 72 and 73 by which the second stage 68 of the amplifier 67—68, the amplifier 40, the amplifier 44, and the switch box 45, on the base 69 are connected to the apparatus on the base 59 may include coupling means 74, similar to the coupling members 66 and 66', whereby the apparatus on the base 59 may be quickly and easily connected to, and disconnected from, the apparatus on the base 69, if this is so desired.

The speaker 38, the counters 41 and 42, and the switch 51 are shown in FIG. 5 as being mounted on another base 75. The cables 76, 77, and 78 by which the speaker 38, the counters 41 and 42, and the switch 51 are connected to the apparatus mounted on the base 69, may also include suitable connectors 79 similar to the connectors 66 and 66' and 74 so that these units may be quickly and easily connected to, and disconnected from, the apparatus mounted on the base 69, if such is desired.

It will be seen that the operation of the reproducing apparatus shown in FIG. 5 is basically the same as the operation of the apparatus shown in FIG. 2, the sound heads 1636, 1739 and 1843 picking up the text signals, timing signals, and marking signals, respectively, as the carrier 12 is advanced through the portable unit 59 by the drive wheel 1348, and being operable through the operation of the associated apparatus connected thereto, respectively, to reproduce the spoken words, count the time signals, and stop the driving of the carrier 12 in response to marking signals, respectively, in the same manner as heretofore discussed with respect to the apparatus shown in FIG. 2. The switch 51, shown in FIG. 5, is effective upon actuation to again initiate movement of the carrier 12 after the latter has been stopped by the pick up of a marking signal by the sound head 1843.

In FIG. 6 a modified form of that portion of the apparatus shown mounted on the base 75 in FIG. 5 is diagrammatically illustrated. The modified form of the invention shown in FIG. 6 is identical to the aforementioned portion of the apparatus shown in FIG. 5 except that a printing mechanism 80 has been added thereto by which a suitable strip of paper 81 may be fed across the counters 41 and 42 and the readings recorded on the counters 41 and 42 impressed on the paper 81 upon actuation of the printing mechanism 80 such as, for example, by operating the handle 82. The printing mechanism 80 may include a suitable platen 83 movable by the handle 82 into position to press the paper 81 into printing engagement with suitable type members, not shown, which may comprise the members affording the readings on the counters 41 and 42. If desired, the printing mechanism 80 may be so arranged that operation of the handle 82 is effective to advance the paper 81, and is also effective to actuate the switch 51 to thereby again initiate advancement of the carrier 12 through the reproducing apparatus after the same has been stopped by the pick up of a marking signal, and after the printing mechanism 80 has been actuated to print the readings of the counters 41 and 42 on the paper 81.

Relatively recently, magnetic tapes have become known which have surfaces thereon which are receptive to pencil or pen markings. In some instances, it is not only desirable to have magnetic signals impressed on the carrier but also optical signals or markings which are readily visible to the operator evaluating the intelligence recorded on the tape.

Figure 3:
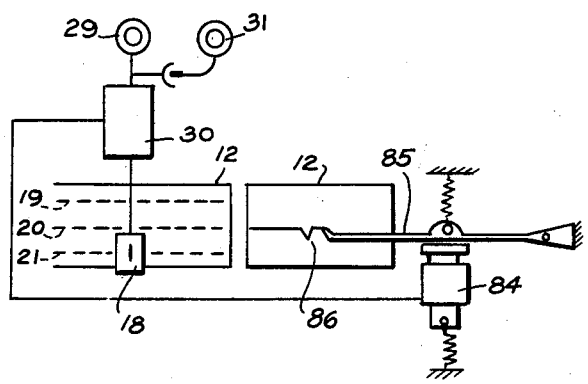
FIG. 3 is a diagrammatic illustration of additional apparatus which may be embodied in the apparatus shown in FIGS. 1 and 5.

In FIG. 3, a modified form of the present invention is shown.

The solenoid 84 is connected to the amplifier 30, FIG. 1 and FIG. 3, in parallel to the sound head 18, so that when an impulse is fed from the amplifier 30 to the sound head 18, and a marking signal is thereby magnetically impressed by the latter on the track 21 of the carrier 12, the marking lever 85 is also actuated to impress a visible signal in the form of a pip 86, or the like, on the carrier 12 at the same place where the marking signal was impressed. This method can be very widely used and affords a high degree of accuracy in the measurement of time intervals occurring between very closely spaced marking signals.

Figure 4:
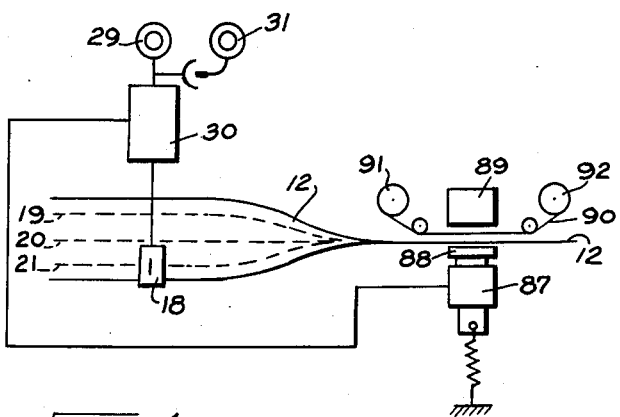
FIG. 4 is a modified form of additional apparatus shown in FIG. 3.

Instead of impressing lines on the carrier 12 by using a marking lever 85 it is also possible to print on the carrier 12 signals, for example, the readings of a counter which is provided with a printing device. A preferred embodiment of this type of counter is illustrated in FIG. 4. The solenoid 87 is actuated by the marking signals in the way described in connection with FIG. 3. The solenoid 87 incorporates a hammer 88 by which the carrier 12 is struck against the characters of a counter 89. A ribbon 90 is arranged between the carrier 12 and the characters of the counter 89. This ribbon 90 is moved in known manner from roller 91 to roller 92 and vice versa.

Upon energization of solenoid 87, both the carrier 12 and the ribbon 90 are struck by the hammer 88 against the characters of the counter 89. The signals being printed on the carrier 12 in this manner correspond to the characters of the counter 89. By using a counter of the type just described which is driven by the clock 28, FIGS. 1 and 5, producing the time signals, it is possible to impress on the carrier 12 data relating to the time required in a particular phase of the process or operation being studied.

If for example the time, work, or motion study is to be temporarily suspended, the beginning and end of the break are printed on the carrier 12. The time will then be measured even if the carrier 12 is at a standstill and no time signals are being impressed on the carrier.

If the process or operation being studied can be described in a few words but extends over a long period of time, the carrier 12 may be temporarily stopped and the beginning and end of the break printed on the carrier 12. It is thus possible to save time in the evaluation of the carrier.

Reading the figures printed on the carrier 12 presents no difficulty, since, in accordance with the present invention, an electromagnetic marking signal is impressed on the carrier 12 simultaneously with the figure. When playing back, the carrier 12 will stop whenever a marking signal passes the sound head 43. Therefore, the figures printed on the carrier 12 will stand still always in the same place relative to the evaluating instrument where they can be read off.

It will be remembered that in some instances it is desirable to use a plurality of switches, such as the switches 29, 31, FIG. 1, for impressing signals on the carrier 12 from a single recording head 18. In such instances the solenoid 84 (FIG. 3) and 87 (FIG. 4) affords a highly practical device for impressing signals for certain types of data which are readily distinguishable from signals for other types of data being recorded simultaneously therewith. Thus, for example, when a plurality of switches such as the switch 31 are used, certain of the switches may, if desired, be connected through an amplifier such as the amplifier 30, to the recording head 18, and the other of the switches may be connected through a separate amplifier (not shown) to the solenoid 84, 87. In this manner, it is possible with a single recording device, to record at the same time different movements of a machine. For example, the switch 31, which is connected to the solenoid 84 or 87, may be connected to a typewriter in such a position that the solenoid is actuated each time a key of the typewriter is struck. At the same time, the other switch 29, which is connected to the recording head 18, may be connected to the typewriter in such a position that they are actuated at the end of each stroke of the carriage of the typewriter. With this arrangement, the marking lever 85 or the printing hammer 88 will be effective to impress visible signals denoting movement of the keys, while the sound head 18 will magnetically impress signals denoting movement of the carriage.

The apparatus hereinbefore described is primarily intended for use in the making and evaluation of time, work and motion studies. It permits the measurement of the time necessary to carry out short phases of processes or operations being studied with an accuracy heretofore unknown in the art. As compared with film recordings, it has the advantage of more rapid evaluation and a lower cost.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. Apparatus for use in making time, work and motion studies comprising a movable magnetic carrier having time signals and marking signals impressed thereon, means for producing electrical impulses from said impressed signals, means connected to said first mentioned means for counting said impulses produced from said time signals, means for moving said carrier, said means including a roller normally engaged with said carrier, brake means, said means for moving said carrier and said brake means functioning so as alternately to engage and disengage said carrier, electrical means for producing electrical impulses from said impressed signals, means connected to said electrical means for counting said impulses produced from said time signals, and means connected to said electrical means and operable in response to said impulses produced from said marking signals to move said roller out of engagement with said carrier while simultaneously operating said brake means and thereby stopping the movement of said carrier.

2. Apparatus for use in making time and motion studies comprising a movable magnetic carrier having time signals and marking signals impressed thereon, means for producing electrical impulses from said impressed signals, means connected to said first mentioned means for counting said impulses produced from said time signals, and brake means connected to said first mentioned means and operable in response to said impulses produced from said marking signals to automatically clampingly engage said carrier and thereby stop the latter.

3. Apparatus as defined in claim 2, and in which said carrier has text signals impressed thereon, and in which said means for producing electrical impulses includes means for simultaneously picking up said time signals and said text signals.

4. Apparatus as defined in claim 2, and in which said first mentioned means includes two sound heads engaged with said carrier in position to selectively pick up said time signals and marking signals, respectively.

5. Apparatus as defined in claim 2, and in which said carrier has spoken text signals impressed thereon, and in which said text signals and said time signals are disposed between said marking signals, and in which said first mentioned means includes means operatively engaged with said carrier in position to pick up all of said signals.

6. Apparatus as defined in claim 5, and which includes means operatively connected to said first mentioned means for reproducing spoken text signals picked up by said means operatively engaged with said carrier.

7. Apparatus as defined in claim 2, and in which said first mentioned means includes means engageable with said carrier; and which includes switch means operatively connected to said first mentioned means and movable between two operative positions; and in which said means engageable by said carrier are operable to pick up said time signals and said marking signals from said carrier, when said switch is disposed in one of said positions, and to impress such time signals and such marking signals on said carrier when said switch is disposed in the other of said positions.

8. Apparatus as defined in claim 7, and in which said means for impressing time signals includes a sound head engageable with said carrier, a timing device, an electric signal emitter connected to said head, said signal emitter being connected to said timing device and operable thereby in timed relation thereto to emit impulses to said head and thereby impress said time signals on said carrier.

9. Apparatus as defined in claim 2, and in which said carrier has text signals impressed therein; and in which said time signals, marking signals and text signals are disposed in respective areas on said carrier; and in which said first mentioned means includes a plurality of sound heads, each of said sound heads being disposed in position to engage a respective one of said areas; and which includes switch means operatively connected to said sound heads and movable between two operative positions; and in which said respective sound heads are operable to pick up time signals, marking signals and text signals from said respective areas, and to impress time signals, marking signals and text signals on said respective areas, when said switch is disposed in respective ones of said operative positions.

10. Apparatus as defined in claim 9, and which includes another sound head engaged with all of said areas for picking up text signals, time signals and marking signals, and signal means connected to said other head and responsive to the pick up of any of said text signals, time signals and marking signals by said other head to emit a signal.

11. Apparatus for use in making time, work and motion studies comprising an elongated magnetic tape having a text-signal track, a time-signal track and a marking-signal track extending longitudinally thereof in parallel relation to each other; means, including a drive roller normally engaged with said tape for longitudinally moving said tape; brake means normally disengaged from said tape and movable into clamping engagement with said tape for stopping longitudinal movement of the latter; means for impressing signals on each of said three tracks, said last mentioned means comprising means, including a sound head engaged with said text-signal track and a microphone operatively connected to said sound head for impressing spoken text signals on said text-signal track at any place along the length thereof during said movement of said tape, means, including a second sound head engaged with said time-signal track and a clock operatively connected to said second sound head, for impressing time signals on said time-signal track at any place along the length thereof during said movement of said tape, and means, including a third sound head engaged with said marking-signal track and a switch operatively connected to said third sound head, for impressing marking-signals on said marking-signal track at any place along the length thereof during said movement of said tape; means, including said three heads, for picking up said signals from said three tracks during longitudinal movement of said tape; and means connected to said first mentioned means and operable in response to the pick up of any one of said marking-signals by said third head to move said roller out of engagement with said tape while simultaneously moving said brake means into clamping engagement with said tape to thereby stop said longitudinal movement of said tape.

References Cited in the file of this patent

UNITED STATES PATENTS

| | | |
|---|---|---|
| 2,088,297 | Koenig | July 27, 1937 |
| 2,496,103 | Neufeld | Jan. 31, 1950 |
| 2,535,486 | Dank | Dec. 26, 1950 |
| 2,615,989 | Thad | Oct. 28, 1952 |
| 2,677,728 | Kolb et al. | May 4, 1954 |
| 2,680,239 | Daniels et al. | June 1, 1954 |
| 2,703,714 | Demby et al. | Mar. 8, 1955 |
| 2,900,132 | Burns et al. | Aug. 18, 1959 |
| 2,995,630 | Kabrick | Aug. 8, 1961 |

FOREIGN PATENTS

| | | |
|---|---|---|
| 847,985 | Germany | Aug. 28, 1952 |
| 698,402 | Great Britain | Oct. 14, 1953 |